US012659591B2

(12) United States Patent
Sugaya

(10) Patent No.: US 12,659,591 B2
(45) Date of Patent: Jun. 16, 2026

(54) IMAGING APPARATUS CAPABLE OF PERFORMING EXPOSURE CONTROL BASED ON A PARTIAL IMAGE REGION, IMAGING SYSTEM, CONTROLLING METHOD, AND STORAGE MEDIUM

(71) Applicant: CANON KABUSHIKI KAISHA, Tokyo (JP)

(72) Inventor: Atsuto Sugaya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 36 days.

(21) Appl. No.: 18/944,169

(22) Filed: Nov. 12, 2024

(65) Prior Publication Data

US 2025/0168495 A1     May 22, 2025

(30) Foreign Application Priority Data

Nov. 21, 2023    (JP) .................................. 2023-197585

(51) Int. Cl.
| | |
|---|---|
| *H04N 23/695* | (2023.01) |
| *H04N 23/45* | (2023.01) |
| *H04N 23/63* | (2023.01) |
| *H04N 23/661* | (2023.01) |
| *H04N 23/698* | (2023.01) |
| *H04N 23/72* | (2023.01) |
| *H04N 23/90* | (2023.01) |

(52) U.S. Cl.
CPC ........... *H04N 23/695* (2023.01); *H04N 23/45* (2023.01); *H04N 23/632* (2023.01); *H04N 23/661* (2023.01); *H04N 23/662* (2023.01);

*H04N 23/72* (2023.01); *H04N 23/90* (2023.01); *H04N 23/698* (2023.01)

(58) Field of Classification Search
None
See application file for complete search history.

(56) References Cited

U.S. PATENT DOCUMENTS

| | | | |
|---|---|---|---|
| 2019/0166294 A1* | 5/2019 | Ouyang ................ | H04N 5/2226 |
| 2019/0230269 A1* | 7/2019 | Saito ................ | G08B 13/19617 |
| 2023/0206410 A1* | 6/2023 | Choi .................... | H04N 23/951 |

FOREIGN PATENT DOCUMENTS

| | | |
|---|---|---|
| JP | 2008507229 A | 3/2008 |
| WO | 2006040687 A2 | 4/2006 |

* cited by examiner

*Primary Examiner* — Paul M Berardesca
(74) *Attorney, Agent, or Firm* — Cowan, Liebowitz & Latman, P.C.

(57) ABSTRACT

There is provided with an imaging apparatus. A first imaging unit obtains a first captured image. A second imaging unit obtains a second captured image. A third imaging unit captures a partial region that is a region of a part of the first captured image, a region of a part of the second captured image, or a region of a part of a composite image obtained by compositing the first captured image and the second captured image. A selection unit selects an imaging unit to be used to set an exposure parameter of the third imaging unit on the basis of a position of the set partial region. A setting unit sets the exposure parameter of the third imaging unit on the basis of an exposure parameter of the imaging unit selected.

13 Claims, 6 Drawing Sheets

FIG. 2

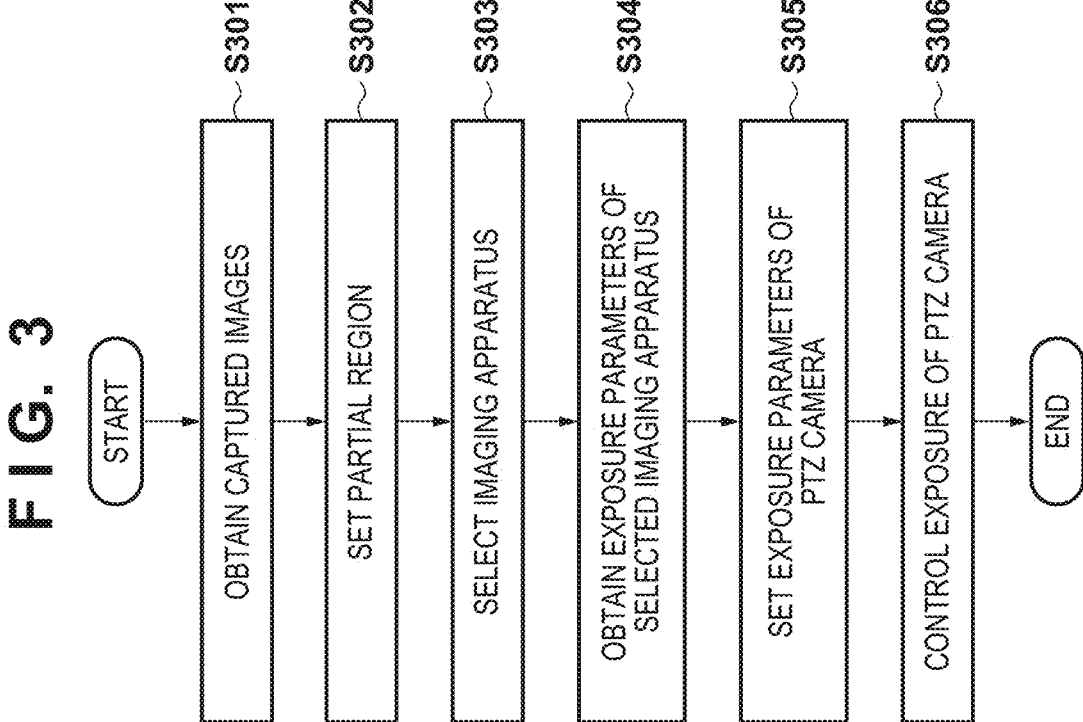
F I G. 4
ESTIMATED EV VALUE
TV
AV
SV
EV
F I G. 3
START
OBTAIN CAPTURED IMAGES    S301
SET PARTIAL REGION    S302
SELECT IMAGING APPARATUS    S303
OBTAIN EXPOSURE PARAMETERS OF SELECTED IMAGING APPARATUS    S304
SET EXPOSURE PARAMETERS OF PTZ CAMERA    S305
CONTROL EXPOSURE OF PTZ CAMERA    S306
END

FIG. 5

IMAGING APPARATUS CAPABLE OF PERFORMING EXPOSURE CONTROL BASED ON A PARTIAL IMAGE REGION, IMAGING SYSTEM, CONTROLLING METHOD, AND STORAGE MEDIUM

BACKGROUND OF THE INVENTION

Field of the Invention

The present invention relates to an imaging apparatus, an imaging system, a controlling method, and a storage medium.

Description of the Related Art

In photography using a plurality of imaging units, a method is known in which an image shot by one of the imaging units is used to control a shooting range of another imaging unit. Japanese Patent Laid-Open No. 2008-507229 discloses a technique in which PTZ control performed at least partially on the basis of a wide-angle image shot by a master camera is transmitted to a slave camera. This document also discloses automatically adjusting the exposure by comparing a histogram of an image from the slave camera with a histogram of an image from the master camera.

SUMMARY OF THE INVENTION

According to one embodiment of the present invention, an imaging apparatus comprises: a first imaging unit configured to obtain a first captured image; a second imaging unit configured to obtain a second captured image; a third imaging unit configured to capture a partial region that is a region of a part of the first captured image, a region of a part of the second captured image, or a region of a part of a composite image obtained by compositing the first captured image and the second captured image; a first setting unit configured to set the partial region; a selection unit configured to select, from among the first imaging unit and the second imaging unit, an imaging unit to be used to set an exposure parameter of the third imaging unit on the basis of a position of the partial region; and a second setting unit configured to set the exposure parameter of the third imaging unit on the basis of an exposure parameter of the imaging unit selected.

According to another embodiment of the present invention, an imaging system comprises an information processing apparatus, the information processing apparatus including: a first imaging apparatus configured to obtain a first captured image; a second imaging apparatus configured to obtain a second captured image; a third imaging apparatus configured to capture a partial region that is a region of a part of the first captured image, a region of a part of the second captured image, or a region of a part of a composite image obtained by compositing the first captured image and the second captured image; a first setting unit configured to set the partial region; a selection unit configured to select, from among the first imaging apparatus and the second imaging apparatus, an imaging apparatus to be used to set an exposure parameter of the third imaging apparatus on the basis of a position of the partial region; and a second setting unit configured to set the exposure parameter of the third imaging apparatus on the basis of an exposure parameter of the imaging apparatus selected.

According to another embodiment of the present invention, a controlling method for controlling an imaging apparatus comprising: a first imaging unit configured to obtain a first captured image; a second imaging unit configured to obtain a second captured image; a third imaging unit configured to capture a partial region that is a region of a part of the first captured image, a region of a part of the second captured image, or a region of a part of a composite image obtained by compositing the first captured image and the second captured image, comprises: setting the partial region; selecting, from among the first imaging unit and the second imaging unit, an imaging unit to be used to set an exposure parameter of the third imaging unit on the basis of a position of the partial region; and setting the exposure parameter of the third imaging unit on the basis of an exposure parameter of the imaging unit selected.

According to another embodiment of the present invention, a non-transitory computer-readable storage medium stores a program which, when executed by an imaging apparatus comprising: a processor; a memory; a first imaging unit configured to obtain a first captured image; a second imaging unit configured to obtain a second captured image; a third imaging unit configured to capture a partial region that is a region of a part of the first captured image, a region of a part of the second captured image, or a region of a part of a composite image obtained by compositing the first captured image and the second captured image, causes the imaging apparatus to: setting the partial region; selecting, from among the first imaging unit and the second imaging unit, an imaging unit to be used to set an exposure parameter of the third imaging unit on the basis of a position of the partial region; and setting the exposure parameter of the third imaging unit on the basis of an exposure parameter of the imaging unit selected.

Further features of the present invention will become apparent from the following description of exemplary embodiments (with reference to the attached drawings).

BRIEF DESCRIPTION OF THE DRAWINGS

FIG. 2 is a diagram illustrating an example of a display image according to a first embodiment.

FIG. 3 is a flowchart illustrating an example of information processing according to the first embodiment.

FIG. 4 is a diagram illustrating exposure parameters corresponding to Ev according to the first embodiment.

FIG. 5 is a diagram illustrating an example of a display image according to a second embodiment.

DESCRIPTION OF THE EMBODIMENTS

Figure 1:
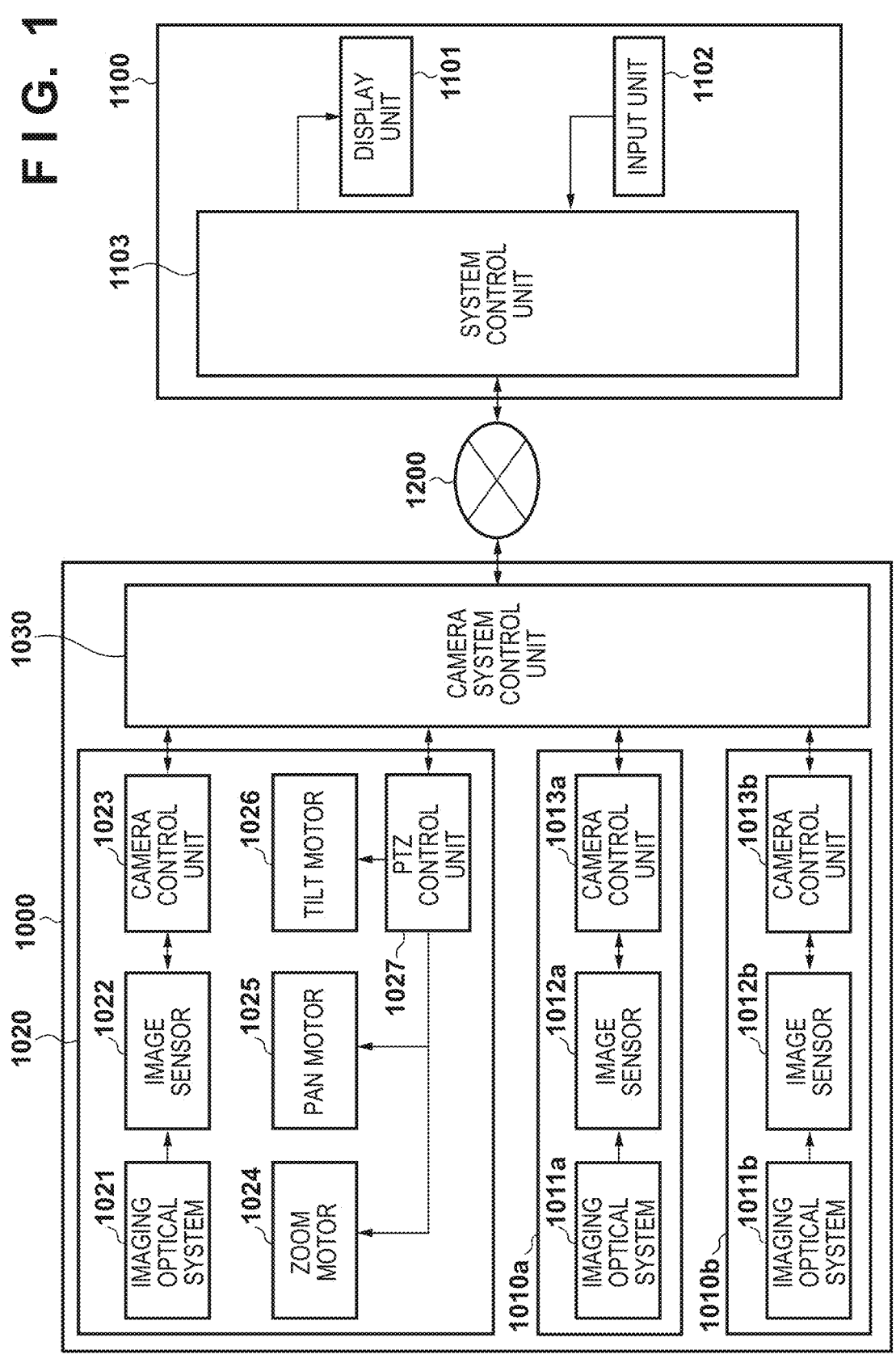
FIG. 1 is a block diagram illustrating an example of the configuration of an imaging system including an information processing apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

However, if an imaging apparatus aside from the slave camera and the master camera is also used, it is conceivable that applying the technique disclosed in Japanese Patent Laid-Open No. 2008-507229 will complicate the histogram comparison processing.

An object of the present invention is to make it possible to easily set an exposure value when using a plurality of imaging apparatuses.

First Embodiment

An information processing apparatus according to the first embodiment generates a composite image obtained by compositing captured images captured by a plurality of imaging apparatuses, and sets a partial region in the generated composite image. Then, on the basis of the position of the partial region in the composite image, the information processing apparatus selects an imaging apparatus to be used to set the exposure parameters of the imaging apparatuses, and then sets exposure parameters of a PTZ camera on the basis of the exposure parameters of the selected imaging apparatus.

FIG. 1 is a block diagram illustrating an example of the configuration of an imaging system including an information processing apparatus 1100 according to the present embodiment. The imaging system according to the present embodiment includes an imaging apparatus 1000, the information processing apparatus 1100, and a network 1200. The imaging apparatus 1000 and the information processing apparatus 1100 are communicatively connected to each other over the network 1200. This enables the imaging apparatus 1000 to deliver video data (images) to the information processing apparatus 1100 over the network 1200. The information processing apparatus 1100 sends various types of commands to the imaging apparatus 1000. The imaging apparatus 1000 sends responses to those commands to the information processing apparatus 1100.

The network 1200 is constituted by a plurality of routers, switches, cables, and the like that use a communication standard such as Ethernet (registered trademark), for example. The communication standard, scale, and configuration of the network 1200 are not particularly limited as long as the imaging apparatus 1000 and the information processing apparatus 1100 can communicate with each other. The network 1200 may be the Internet, a wired Local Area Network (LAN), a wireless LAN, a Wide Area Network (WAN), or the like, for example. Note that the imaging apparatus 1000 according to the present embodiment may, for example, support Power over Ethernet (POE) (registered trademark), and may be supplied with power over a LAN cable.

The imaging apparatus 1000 is an imaging apparatus including a plurality of imaging units. The imaging apparatus 1000 according to the present embodiment includes fixed cameras 1010a and 1010b, a Pan-Tilt-Zoom (PTZ) camera 1020, and a camera system control unit 1030.

The fixed cameras 1010a and 1010b according to the present embodiment are cameras having a fixed imaging range. The fixed camera 1010a includes an imaging optical system 1011a, an image sensor 1012a, and a camera control unit 1013a. The imaging optical system 1011a is an optical system that focuses light incident from a subject onto the image sensor 1012a, and includes an aperture stop for adjusting the light amount, a focus lens for focus adjustment, and the like. The image sensor 1012a is, for example, a CCD sensor or a CMOS sensor that converts light received at a light-receiving surface into an electrical signal and outputs the signal to the camera control unit 1013a as image data. The camera control unit 1013a controls the fixed camera 1010a, including controlling exposure parameters of the fixed camera 1010a. The camera control unit 1013a according to the present embodiment controls the exposure parameters by, for example, configuring the aperture or the image sensor 1012a and adjusting the focus lens on the basis of the result of analyzing the input signal from the image sensor 1012a. The camera control unit 1013a also applies various types of image processing to the captured data input from the image sensor 1012a, and outputs the processed data to the camera system control unit 1030. Any desired processing performed by a typical imaging apparatus can be used as the processing performed by the imaging optical system 1011a, the image sensor 1012a, and the camera control unit 1013a as long as an imaging result can be output as image data.

The fixed camera 1010b includes an imaging optical system 1011b, an image sensor 1012b, and a camera control unit 1013b having the same functions as the imaging optical system, the image sensor, and the camera control unit provided in the fixed camera 1010a. Although the following descriptions assume that the fixed camera 1010a, the fixed camera 1010b, and the PTZ camera 1020 (described later) are imaging apparatuses of the same type (e.g., having the same model number), each of these cameras may be a different type of imaging apparatus. Furthermore, although the two fixed cameras 1010a and 1010b are illustrated as the fixed cameras in FIG. 1, the number of fixed cameras is not particularly limited as long as at least two are provided. Note that although the present embodiment assumes that the fixed cameras are cameras having fixed attitudes, the attitudes of the cameras may be controllable as long as the same imaging processing can be performed. Furthermore, in the following, the fixed camera 1010a and the fixed camera 1010b may be referred to simply as "fixed cameras" without distinguishing between the two.

Note that although the present embodiment assumes that each fixed camera is an imaging apparatus having the same angle of view, each fixed camera may have different imaging settings, and different types of imaging apparatuses may be used as the fixed cameras. For example, the fixed camera 1010a may be an imaging apparatus capable of capturing an image having a wider-angle imaging range than the fixed camera 1010b.

The PTZ camera 1020 is an imaging apparatus having a variable imaging range. The PTZ camera 1020 includes an imaging optical system 1021, an image sensor 1022, and a camera control unit 1023 having the same functions as the imaging optical system, the image sensor, and the camera control unit provided in the fixed camera 1010a. The PTZ camera 1020 further includes a zoom motor 1024, a pan motor 1025, a tilt motor 1026, and a PTZ control unit 1027. The zoom motor 1024 controls the angle of view of the PTZ camera 1020. The pan motor 1025 and the tilt motor 1026 drive the PTZ camera 1020 in a pan direction and a tilt direction. The PTZ control unit 1027 controls the zoom motor 1024, the pan motor 1025, and the tilt motor 1026.

The camera system control unit 1030 obtains image data from each of the fixed cameras 1010a and 1010b and the PTZ camera 1020, and transmits the obtained image data to the information processing apparatus 1100 over the network 1200. The camera system control unit 1030 also provides control commands to the fixed cameras 1010a and 1010b and the PTZ camera 1020 in response to commands from the information processing apparatus 1100. The camera system control unit 1030 further obtains responses to the control commands and control information from the fixed cameras 1010a and 1010b and the PTZ camera 1020.

Figure 7:
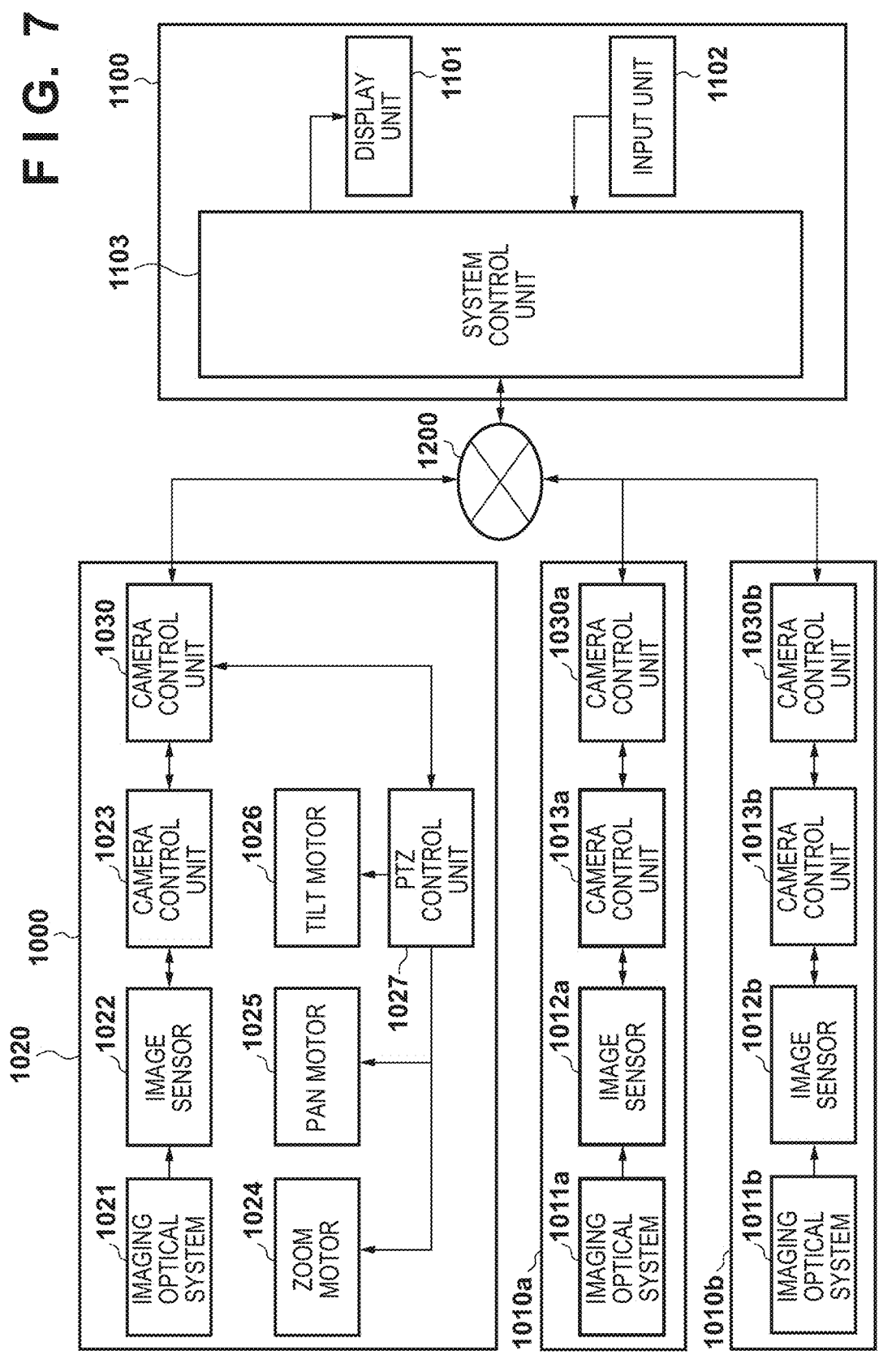
FIG. 7 is a block diagram illustrating another example of the configuration of an imaging system including an information processing apparatus.

Although the present embodiment assumes that the fixed camera 1010a, the fixed camera 1010b, and the PTZ camera 1020 are all imaging units included in the same imaging apparatus 1000, some or all of these cameras may be implemented as separate imaging apparatuses, as illustrated in FIG. 7.

The information processing apparatus 1100 according to the present embodiment includes a display unit 1101, an input unit 1102, and a system control unit 1103. The display unit 1101 is a liquid crystal display, for example, and displays various processing results such as display images (described later). The display unit 1101 can display image data obtained from the system control unit 1103, for example, or a graphical user interface (GUI) for controlling the imaging apparatus 1000. Note that the display unit 1101 may be an apparatus integrated with the information processing apparatus 1100, or may be an external apparatus connected to the information processing apparatus 1100.

The input unit 1102 is a keyboard and a pointing device such as a mouse, that obtains inputs from a user. The user of the information processing apparatus 1100 can make inputs to the GUI through the input unit 1102. The input unit 1102 may be integrated with the information processing apparatus 1100, or may be an external apparatus connected to the information processing apparatus 1100. For example, the display unit 1101 may be a touch panel, and the functions of the input unit 1102 may be provided therein.

The system control unit 1103 transmits various types of commands to the imaging apparatus 1000 over the network 1200 in response to the user operating the GUI through the input unit 1102, and receives various types of data delivered from the imaging apparatus 1000 over the network 1200. The commands according to the present embodiment include commands requesting video data, commands for setting pan, tilt, or zoom for the PTZ camera 1020, and the like.

The system control unit 1103 generates a composite image obtained by compositing a first captured image captured by a first imaging apparatus and a second captured image captured by a second imaging apparatus. The system control unit 1103 also performs display control, such as causing the display unit 1101 to display the generated composite image and the GUI. The system control unit 1103 according to the present embodiment generates the captured image captured by the fixed camera 1010a as the first captured image and the captured image captured by the fixed camera 1010b as the second captured image. The system control unit 1103 according to the present embodiment may further generate an image from the PTZ camera 1020.

Figure 2:
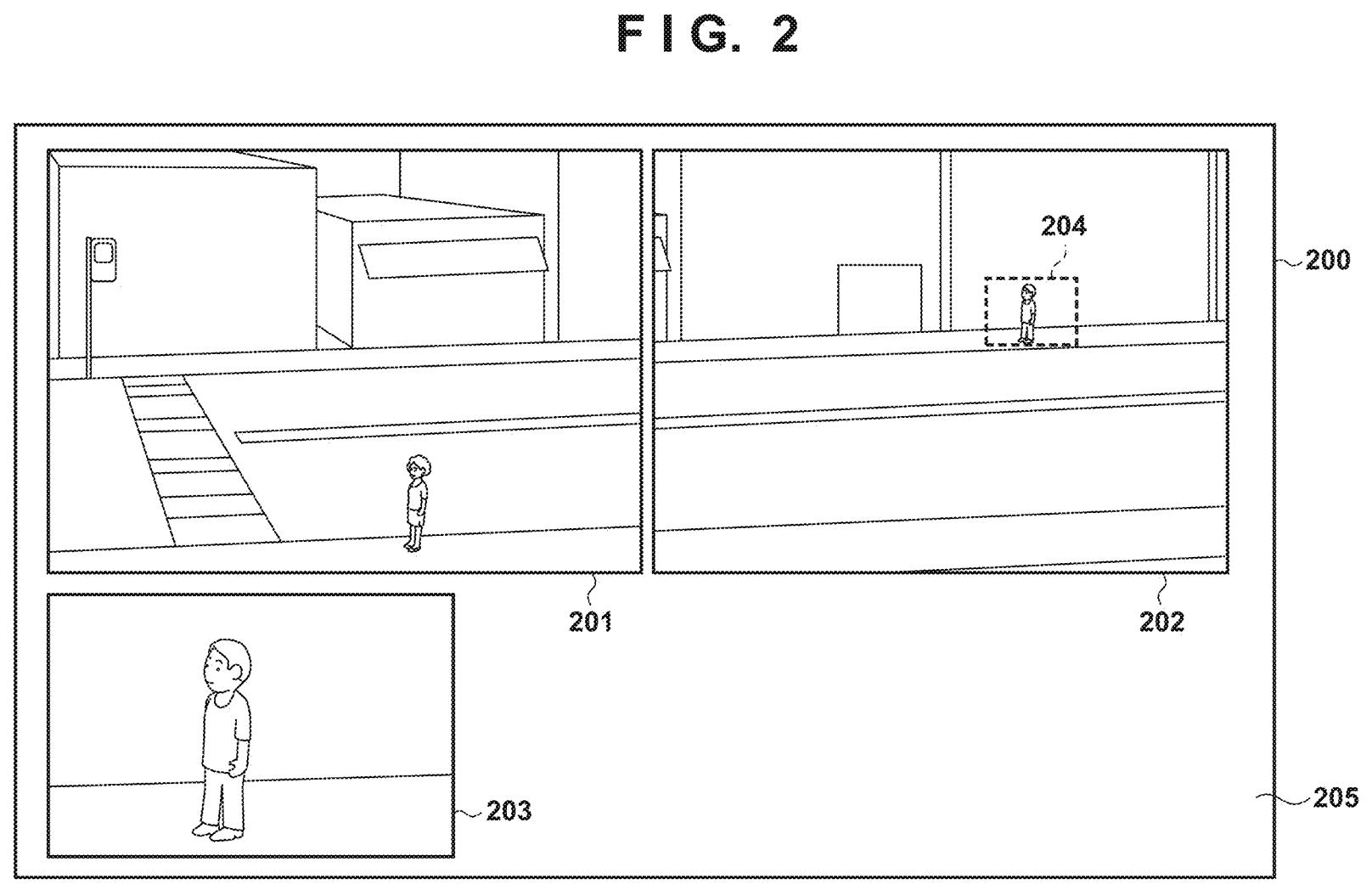

The processing performed by the system control unit 1103 according to the present embodiment will be described hereinafter with reference to FIGS. 2 to 4. FIG. 2 illustrates an example of the display image generated by the system control unit 1103 according to the present embodiment. A captured image 201 captured by the fixed camera 1010a, a captured image 202 captured by the fixed camera 1010b, and a captured image 203 captured by the PTZ camera 1020 are displayed in the display unit 1101.

The camera system control unit 1030 sets a partial region in the first captured image, the second captured image, or the composite image, and selects an imaging apparatus used to set exposure parameters of a third imaging apparatus (here, the PTZ camera 1020) from among the first imaging apparatus and the second imaging apparatus on the basis of a position (the setting) of the partial region in the first captured image, the second captured image, or the composite image. In the example illustrated in FIG. 2, a designated region 204 is set as the partial region, and the designated region 204 is located within the captured image 202. The camera system control unit 1030 according to the present embodiment can select the imaging apparatus that captures the captured image in which the partial region is located as the imaging apparatus to be used to set the exposure parameters of the PTZ camera 1020. Hereinafter, the term "selected imaging apparatus" will be assumed to refer to the imaging apparatus selected to set the exposure parameters of the PTZ camera 1020.

It is assumed here that the designated region 204 is a region set as the imaging range of the PTZ camera 1020. Accordingly, the camera system control unit 1030 can obtain imaging settings indicating an attitude and a zoom amount of the PTZ camera 1020, and set the designated region 204 on the basis of such imaging settings (e.g., in default settings). The position of the designated region 204 may be set, for example, on the basis of the positional relationship between the PTZ camera and each of the imaging apparatuses, or on the basis of a correspondence relationship between the coordinates of a point designated in the first captured image or the second captured image and coordinates using the PTZ camera 1020 as a reference, and any publicly-known method can be used.

In this manner, the camera system control unit 1030 can set the partial region in the first captured image or the second captured image, and set the imaging range of the PTZ camera 1020 to capture such a partial region.

Meanwhile, the designated region 204 may be set on the basis of a user input, and may be changed on the basis of a user input. The input through which the user sets the designated region 204 may, for example, be made through a dragging input made using a mouse cursor, through an input that sets the coordinates and size of the designated region 204, or through an input that sets a reference point of the designated region 204. For example, a rectangular region of a predetermined size centered on a point where the user has made a touch input on a touch panel in which a display screen is displayed may be set as the designated region 204. The designated region 204 may be set so as not to straddle a plurality of captured images. Although the designated region is described here as being a rectangular region, the shape of the designated region is not particularly limited, and may be a circular region, or a region for which the user can freely set an outline, for example.

A method for determining in which captured image the designated region 204 is located will be described next. The system control unit 1103 may determine a captured image including a predetermined position of the designated region (for example, the centroid thereof) as the captured image in which the designated region 204 is located. Additionally, for example, the camera system control unit 1030 may determine all captured images with which the designated region 204 overlaps as captured images in which the designated region 204 is located, for example.

The camera system control unit 1030 sets the exposure parameters of the PTZ camera 1020 on the basis of the exposure parameters of the selected imaging apparatus. For example, the camera system control unit 1030 may calculate the exposure parameters of the PTZ camera 1020 from the exposure parameters of the selected imaging apparatus, and may set the exposure parameters of the PTZ camera 1020 to the same values as the exposure parameters of the selected imaging apparatus. Although an aperture value Av, a shutter speed Tv, a gain Sv, and an exposure value Ev will be described here as being used as the exposure parameters, other parameters related to the brightness of the captured image may be included in the exposure parameters.

For example, the camera system control unit 1030 may store a table in which other exposure parameters (here, Av, Tv, and Sv) corresponding to the exposure value Ev in the PTZ camera 1020 are recorded in advance. In this case, the camera system control unit 1030 may obtain exposure parameters corresponding to the Ev of the selected imaging apparatus by referring to the table, and set those exposure parameters as the exposure parameters of the PTZ camera 1020. FIG. 4 is a diagram illustrating an example of the value of each exposure parameter corresponding to the Ev. If the configuration of the sensor or the lens is different between the selected imaging apparatus and the PTZ camera 1020, the camera system control unit 1030 may calculate the exposure parameters after correcting such a difference, e.g., in the sensitivities of the sensors or the like.

The camera system control unit 1030 can also calculate control amounts for pan, tilt, and zoom drive in the PTZ camera 1020 to capture the designated region 204 set in this manner. The camera system control unit 1030 can then change the imaging range of the PTZ camera 1020 by transmitting control commands for performing such control to drive units.

FIG. 3 is a flowchart illustrating an example of processing performed by the imaging apparatus 1000 to set the exposure parameters of the PTZ camera 1020 based on the designated region 204. The processing illustrated in FIG. 3 is started, for example, when the PTZ camera 1020 is started up. This flowchart is realized by the camera system control unit 1030 executing a program loaded into a RAM.

In step S301, the camera system control unit 1030 obtains captured images from the fixed camera 1010a, the fixed camera 1010b, and the PTZ camera 1020, respectively.

In step S302, the camera system control unit 1030 sets the partial region (the designated region 204) in the display image. Here, as described above, the camera system control unit 1030 may set the partial region on the basis of the imaging settings of the PTZ camera 1020, and may set the partial region on the basis of a user input.

In step S303, the camera system control unit 1030 selects an imaging apparatus to be used to set the exposure parameters of the PTZ camera 1020 from among the fixed camera 1010a and the fixed camera 1010b on the basis of the setting (position) of the partial region in the first captured image or the second captured image. If the partial region is being changed through a user input, a PTZ driving instruction may be made to the PTZ camera 1020 to capture that partial region.

In step S304, the camera system control unit 1030 obtains the exposure parameters of the imaging apparatus selected in step S303. In step S305, the camera system control unit 1030 sets the exposure parameters of the PTZ camera 1020 on the basis of the exposure parameters obtained in step S304. In step S306, the camera system control unit 1030 controls the PTZ camera 1020 such that the exposure thereof is set using the exposure parameters set in step S305, after which the sequence ends.

According to this processing, the imaging apparatus can be selected on the basis of a partial region in the first captured image or the second captured image, and the exposure parameters of the PTZ camera can be set on the basis of the exposure parameters of the selected imaging apparatus. This makes it possible to reduce the exposure difference between the selected imaging apparatus and the PTZ camera, and avoid a situation where the exposure is unnatural. Furthermore, the exposure parameters can be determined prior to changing the imaging range of the PTZ camera 1020, which also reduces the time required to converge on the exposure in response to the imaging range of the PTZ camera 1020 being changed.

The system control unit 1103 may also accept an input to correct the exposure for the PTZ camera 1020 made by the user. For example, if the Ev is corrected on the basis of a user input, the system control unit 1103 can use the corrected Ev to set the exposure parameters of the PTZ camera 1020 with reference to the above-described table.

The information processing apparatus 1100 according to the present embodiment sets the exposure parameters of the PTZ camera 1020 on the basis of the exposure parameters of a fixed camera. However, the processing need not be performed constantly, and control may be performed such that the exposure parameters of the PTZ camera 1020 are set independently of the exposure parameters of the fixed camera when a predetermined condition (execution condition) is set and that execution condition is met. An example of such an execution condition will be described hereinafter.

During PTZ driving, the exposure will gradually fluctuate, even if exposure control based on a result of analyzing the input signal from the image sensor 1022 is performed. Accordingly, although setting the exposure parameters of the PTZ camera 1020 on the basis of the position of the partial region at a given point in time may result in the exposure subsequently changing in a manner unintended by the user, it is conceivable that even in such a case, the exposure can be corrected through user input as long as the user is monitoring the exposure. When the pan, tilt, or zoom is being driven at a low driving speed, it can be assumed that the user is likely to be viewing an image during that driving. From this perspective, the execution condition can be assumed to be met when, for example, the speed at which the imaging range of the PTZ camera is changed (here, the driving speed of the pan, tilt, or zoom) is less than or equal to a predetermined speed.

Here, the "driving speed of the pan, tilt, or zoom" can be evaluated on the basis of the driving speed of the motor performing the PTZ control, for example. For example, the driving speed of the pan, tilt, or zoom may be determined to be less than or equal to the predetermined speed when the value of the weighted sum of the driving angle per hour of the pan motor 1025 or the tilt motor 1026 and the driving angle per hour of the zoom motor 1024 is less than or equal to a predetermined threshold. The thresholds and weights used here can be set in any manner according to the user's desired conditions.

In addition, when the imaging range of the PTZ camera 1020 is an extremely bright or dark environment compared to the imaging range of the fixed cameras, blown-out highlights or blocked-up shadows may arise if the exposure parameters of the PTZ camera 1020 are continually set on the basis of the exposure parameters of the fixed cameras. From this perspective, the execution condition can be assumed to be met when both (i) the dispersion of the histogram within the designated region 204 in the display image less than or equal to a predetermined threshold at the time the designated region 204 is set and (ii) the absolute value of a difference between the average luminance in the designated region 204 and the average luminance of the entire display image is greater than or equal to a predetermined threshold.

The value of white balance adjustment gain may further be used as an exposure parameter for the fixed cameras. In this case, the system control unit 1103 can set the value of the white balance adjustment gain of the PTZ camera 1020 in the same manner as the other exposure parameters, on the basis of the value of the white balance adjustment gain of the fixed cameras.

Second Embodiment

The information processing apparatus 1100 according to the first embodiment displays the first captured image and the second captured image, respectively, as illustrated in FIG. 2. The imaging apparatus 1000 according to the present embodiment can generate a composite image obtained by compositing the captured images from each fixed camera, and perform the same processing as in the first embodiment using such a composite image. The imaging apparatus 1000 according to the present embodiment has the same configuration as the imaging apparatus illustrated in FIG. 1 and described in the first embodiment, and can perform the same processing. As such, redundant descriptions thereof will be omitted. The imaging apparatus 1000 can determine whether the display image is an image in which a captured image from a fixed camera is provided independently, or a composite image obtained by compositing captured images, on the basis of a user input, for example.

Figure 5:
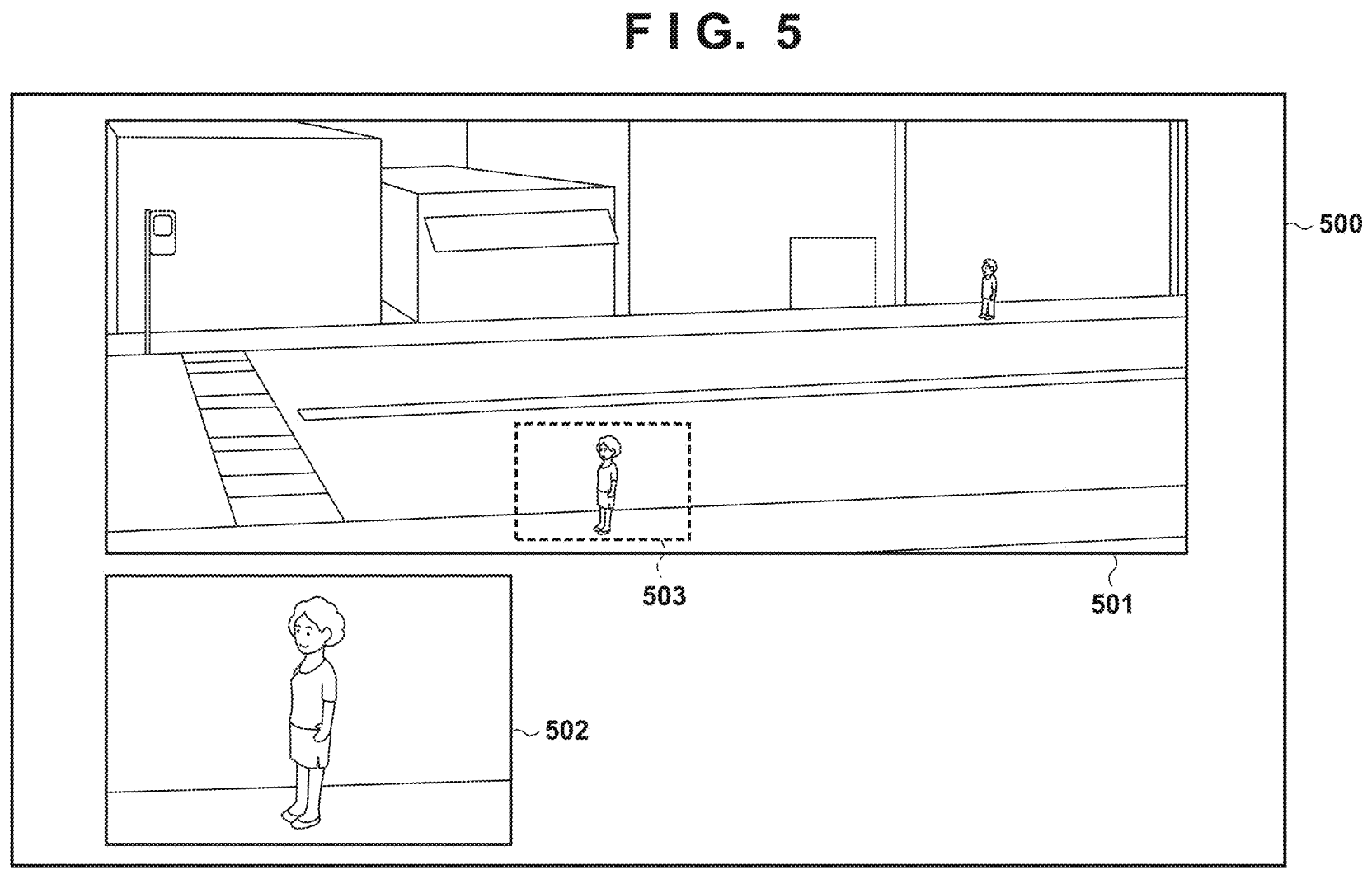
Figure 6:
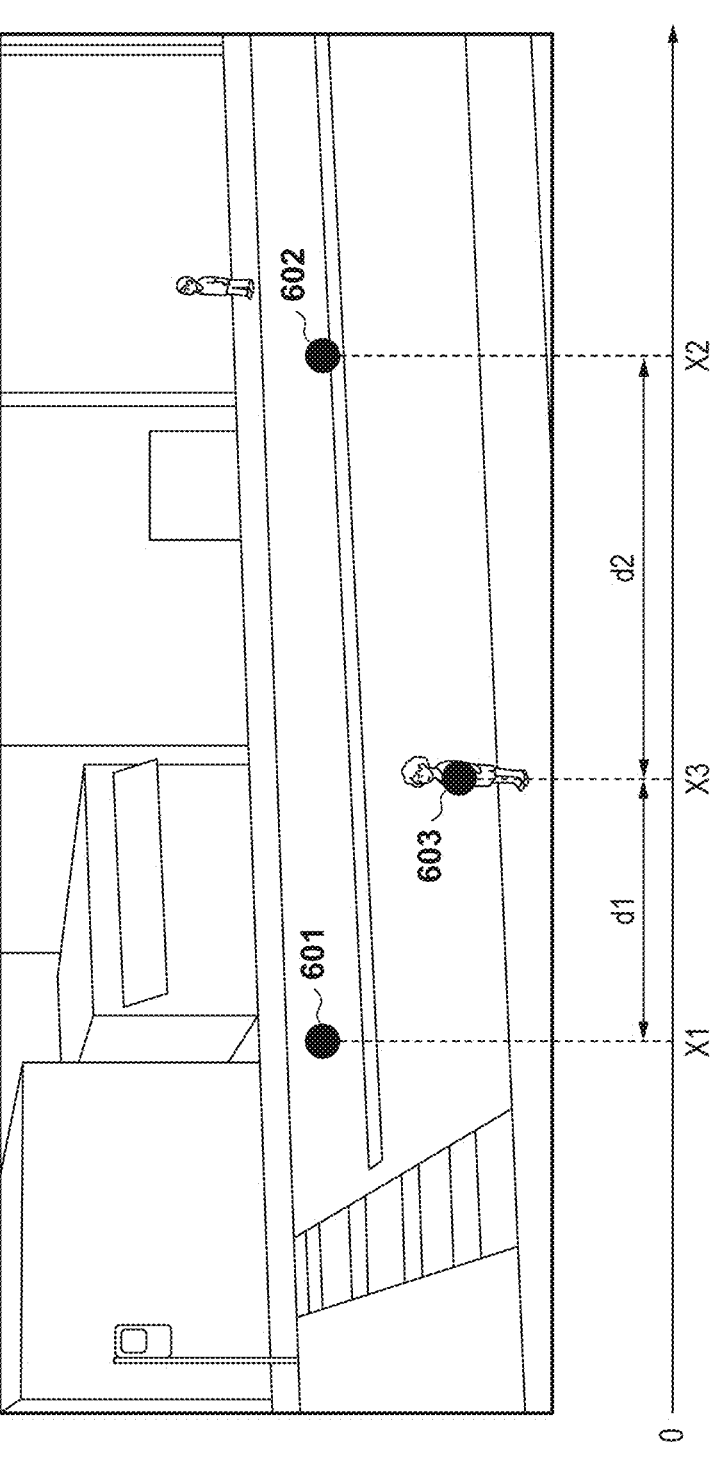
FIG. 6 is a diagram illustrating a panoramic composite image according to the second embodiment.

Processing performed by the camera system control unit 1030 according to the present embodiment will be described hereinafter with reference to FIGS. 5 and 6. FIG. 5 illustrates an example of a composite image generated by the camera system control unit 1030 according to the present embodiment. The images displayed in the display unit 1101 are a panoramic image 501 obtained by compositing the captured image captured by the fixed camera 1010a with the captured image captured by the fixed camera 1010b, and a captured image 502 captured by the PTZ camera 1020.

The camera system control unit 1030 sets a partial region in the composite image, and selects an imaging apparatus to be used to set the exposure parameters of the PTZ camera 1020 from among a first imaging apparatus and a second imaging apparatus on the basis of the position of the partial region in the composite image. In the example in FIG. 5, a designated region 503 is set as the partial region, and the designated region 503 is located in both the captured image captured by the fixed camera 1010a and the captured image captured by the fixed camera 1010b in the panoramic image 501 (the composite image).

The camera system control unit 1030 according to the present embodiment can, when the partial region is located in a plurality of captured images constituting the panoramic image 501, select the imaging apparatuses that captured those captured images as the imaging apparatuses to be used to set the exposure parameters of the PTZ camera 1020. In this case, the camera system control unit 1030 sets the exposure parameters of the PTZ camera 1020 on the basis of the exposure parameters of the selected imaging apparatuses. For example, the camera system control unit 1030 can set the exposure parameters of the PTZ camera 1020 by setting weights on the basis of the positions of the respective captured images in the panoramic image 501 and the position of the designated region 503, and finding the weighted average of the exposure parameters of the selected imaging apparatuses.

This weighted averaging will be described hereinafter with reference to FIG. 6. In FIG. 6, a centroid 601 of the captured image captured by the fixed camera 1010a, a centroid 602 of the captured image captured by the fixed camera 1010b, and a centroid 603 of the designated region 503 are indicated in the panoramic image 501. Here, the system control unit 1103 may set the exposure parameters of the PTZ camera 1020 by finding the weighted average of the exposure parameters of the fixed cameras using weights based on the positions of these centroids. For example, the system control unit 1103 can calculate exposure parameters $EV_{ref}$ of the PTZ camera 1020 by setting weights $w_a$ and $w_b$ as follows with respect to exposure parameters Eva of the fixed camera 1010a and exposure parameters $Ev_b$ of the fixed camera 1010b. It is assumed here that $w_a+w_b$ is 1.

$$Ev_{ref} = w_a \times Ev_a + w_b \times Ev_b$$

The weights $w_a$ and we will be described here. For example, when the left end of the panoramic image is the origin (0, 0), the system control unit 1103 may calculate $w_a$ and $w_b$ as follows, taking the x-coordinates of the centroid 601 as x1, the x-coordinates of the centroid 602 as x2, and the x-coordinates of the centroid 603 as x3.

$$\text{When } x3 < x1,$$
$$w_a = 1, \quad w_b = 0$$
$$\text{When } x1 \leq x3 < x2,$$
$$w_a = \frac{d2}{d1+d2}, \quad w_b = \frac{d1}{d1+d2}$$
$$\text{When } x2 \leq x3,$$
$$w_a = 0, \quad w_b = 1$$

Here, d1 represents the distance between x3 and x1, and d2 represents the distance between x1 and x3. When one of $w_a$ and $w_b$ is 0, the exposure parameters of the PTZ camera 1020 are calculated on the basis of the exposure parameters of one fixed camera as in the first embodiment.

Note that such weights $w_a$ and WE are not calculated on the basis of the x-coordinates of each centroid. For example, the distance between the centroid 601 and the centroid 602 may be taken as d3, the distance between the centroid 602 and the centroid 603 may be taken as d4, and instead of x1≤x3<x2, the weights may be calculated as follows.

$$w_a = \frac{d4}{d3+d4}, \quad w_b = \frac{d3}{d3+d4}$$

Although the number of fixed cameras is described here as being two, the number of fixed cameras is not particularly limited. For example, if four fixed cameras are present and two panoramic images composited from the images from two each of the fixed cameras are displayed the display images, the partial region can be set in one of the panoramic images, and the exposure parameters of the PTZ camera 1020 can be set on the basis of the exposure parameters of the imaging apparatuses that captured the captured images constituting the panoramic image in which the partial region is set. Additionally, for example, if one panoramic image obtained by compositing all the captured images from the four fixed cameras is displayed as the display image, the exposure parameters of the PTZ camera 1020 can be set on the basis of the exposure parameters of all of those imaging apparatuses. In this manner, the system control unit 1103 can change the number of imaging apparatuses selected for use in calculating the exposure parameters of the PTZ camera 1020 in accordance with the number of captured images being composited into the composite image.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-197585, filed Nov. 21, 2023, which is hereby incorporated by reference herein in its entirety.

What is claimed is:

1. An imaging apparatus comprising:
   a first imaging unit configured to obtain a first captured image;
   a second imaging unit configured to obtain a second captured image;
   a third imaging unit configured to capture a partial region that is a region of a part of the first captured image, a region of a part of the second captured image, or a region of a part of a composite image obtained by compositing the first captured image and the second captured image; one or more processors; and
   one or more memories including instructions that, when executed by the one or more processors, cause the imaging apparatus to:
   set the partial region;
   select, from among the first imaging unit and the second imaging unit, an imaging unit to be used to set an exposure parameter of the third imaging unit on the basis of a position of the partial region; and
   set the exposure parameter of the third imaging unit on the basis of an exposure parameter of the imaging unit selected.

2. The imaging apparatus according to claim 1, wherein the instructions further causes the imaging apparatus to:
   obtain an exposure parameter corresponding to an exposure value Ev in the third imaging unit,
   an exposure parameter corresponding to an exposure value Ev of the imaging unit selected is set as the exposure parameter of the third imaging unit.

3. The imaging apparatus according to claim 1, wherein the instructions further causes the imaging apparatus to:
   correct the exposure parameter of the third imaging unit.

4. The imaging apparatus according to claim 3,
   wherein the exposure parameter of the third imaging unit on the basis of a user input is corrected.

5. The imaging apparatus according to claim 1, wherein the exposure parameter of the third imaging unit on the basis of an image signal from the third imaging unit is set when an execution condition is met.

6. The imaging apparatus according to claim 5,
   wherein the third imaging unit is an imaging apparatus having an imaging range that can be changed, and
   the execution condition is a condition met when a speed at which the imaging range of the third imaging unit is changed is less than or equal to a predetermined speed.

7. The imaging apparatus according to claim 6,
   wherein the speed at which the imaging range of the third imaging unit is changed is evaluated on the basis of a driving speed of a pan motor, a tilt motor, or a zoom motor of the third imaging unit.

8. The imaging apparatus according to claim 5,
   wherein the execution condition is a condition met when (i) a histogram within the partial region in the composite image is less than or equal to a first threshold and (ii) an absolute value of a difference between an average luminance within the partial region in the composite image and an average luminance of the composite image as a whole is greater than or equal to a second threshold.

9. The imaging apparatus according to claim 1,
   wherein a number of imaging units selected to be used to set the exposure parameter of the third imaging unit is changed in accordance with a number of captured images.

10. The imaging apparatus according to claim 1,
    wherein the third imaging unit is an imaging apparatus having an imaging range that can be changed,
    the imaging apparatus further comprising:
    a changing unit configured to change the imaging range of the third imaging unit on the basis of the partial region.

11. An imaging system comprising an information processing apparatus, the information processing apparatus including:
    a first imaging apparatus configured to obtain a first captured image;
    a second imaging apparatus configured to obtain a second captured image;
    a third imaging apparatus configured to capture a partial region that is a region of a part of the first captured image, a region of a part of the second captured image, or a region of a part of a composite image obtained by compositing the first captured image and the second captured image; one or more processors; and
    one or more memories including instructions that, when executed by the one or more processors, cause the imaging apparatus to:
    set the partial region;
    select, from among the first imaging apparatus and the second imaging apparatus, an imaging apparatus to be used to set an exposure parameter of the third imaging apparatus on the basis of a position of the partial region; and set the exposure parameter of the third imaging apparatus on the basis of an exposure parameter of the imaging apparatus selected.

12. A controlling method for controlling an imaging apparatus comprising:

a first imaging unit configured to obtain a first captured image;

a second imaging unit configured to obtain a second captured image;

a third imaging unit configured to capture a partial region that is a region of a part of the first captured image, a region of a part of the second captured image, or a region of a part of a composite image obtained by compositing the first captured image and the second captured image, wherein the controlling method comprising:

setting the partial region;

selecting, from among the first imaging unit and the second imaging unit, an imaging unit to be used to set an exposure parameter of the third imaging unit on the basis of a position of the partial region; and setting the exposure parameter of the third imaging unit on the basis of an exposure parameter of the imaging unit selected.

13. A non-transitory computer-readable storage medium storing a program which, when executed by an imaging apparatus comprising:

a processor;

a memory;

a first imaging unit configured to obtain a first captured image;

a second imaging unit configured to obtain a second captured image;

a third imaging unit configured to capture a partial region that is a region of a part of the first captured image, a region of a part of the second captured image, or a region of a part of a composite image obtained by compositing the first captured image and the second captured image, causes the imaging apparatus to:

setting the partial region;

selecting, from among the first imaging unit and the second imaging unit, an imaging unit to be used to set an exposure parameter of the third imaging unit on the basis of a position of the partial region; and setting the exposure parameter of the third imaging unit on the basis of an exposure parameter of the imaging unit selected.

* * * * *